J. A. DEWEY.
RESILIENT WHEEL.
APPLICATION FILED DEC. 22, 1920.

1,410,386.

Patented Mar. 21, 1922.

INVENTOR
JOSIAH A. DEWEY.
BY
Joseph B. Gardner
his ATTORNEY

UNITED STATES PATENT OFFICE.

JOSIAH A. DEWEY, OF SAN FRANCISCO, CALIFORNIA.

RESILIENT WHEEL.

1,410,386.  Specification of Letters Patent.  Patented Mar. 21, 1922.

Application filed December 22, 1920. Serial No. 432,424.

*To all whom it may concern:*

Be it known that I, JOSIAH A. DEWEY, a citizen of the United States, and a resident of the city and county of San Francisco, State of California, have invented a new and useful Resilient Wheel, of which the following is a specification.

My invention relates to a vehicle wheel of the type which is adapted to function as a shock-absorbing medium independently of the tire.

An object of the invention is to provide a resilient wheel in which the resilient element will be of extremely simple form, will operate efficiently under all circumstances and continue so after an extended period of use.

Another object of the invention is to provide a resilient wheel which may be assembled readily, and upon which the tire may be placed and from which it can be removed when desired without difficulty.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings.

Figure 1:
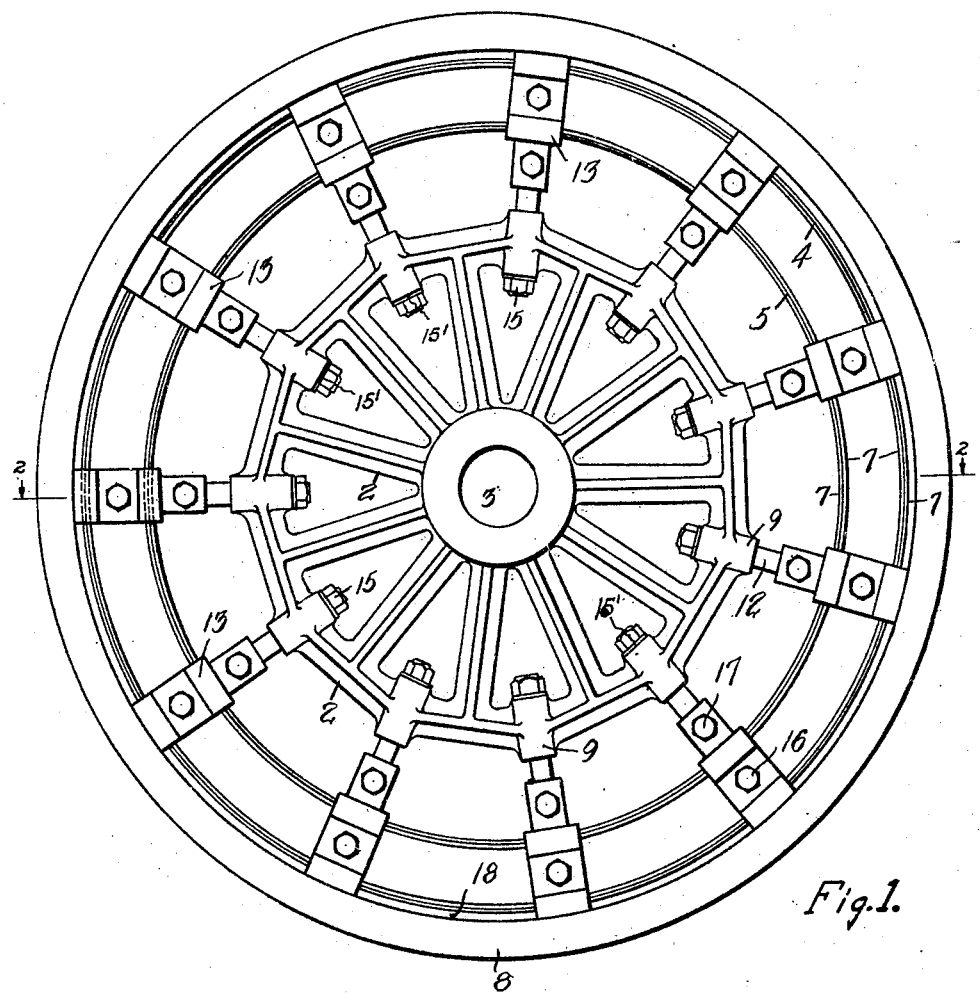
Figure 1 is a side elevation of the wheel of my invention.

Briefly expressed the wheel as here embodied comprises a hub member to which is connected a plurality of concentrically disposed laminated resilient bands by means of spokes which are fixed to the bands by clamps and are arranged to move radially in bearings provided in the hub member when the bands are flexed. The bands are arranged one within the other and fixed in spaced relation, the tire for the wheel being placed upon the outer band and held thereon by the clamps which secure the bands and spokes.

A detailed description of the illustrated form of the invention follows:

The wheel comprises a hub member 2 of web-like construction and provided with a central bore 3 in which the usual bearing members may be inserted. Spaced outwardly from the hub member and concentrically disposed with respect thereto are one or more circular resilient bands 4 and 5 held in spaced relation and each preferably made up of a number of comparatively thin strands or strips 7 of a resilient nature.

The tire 8 is preferably of a resilient nature and is adapted to be held upon the outer band 4 of the wheel. In order that the wheel may supplement the tire in absorbing the shocks, means are provided for enabling the bands to become flexed in conformity with the tire when a load is applied to the wheel. Formed integral with and along the rim portion of the hub member are a plurality of bearings 9 in which are arranged to slidably engage a plurality of radially movable spokes 12 extending outwardly and fixed to the bands 4 and 5. The spokes are secured to the bands by means of opposed clamps 13 and 14, a pair of which are associated with each spoke. The clamps are positioned so as to lie on opposite faces of the wheel and as here shown they are formed to hold the bands in proper spaced relation and to retain the tire in position on the band 4. Passing through the clamps are bolts 16 and 17 the former of which enable the clamps to hold the bands tightly in position whereas the latter extend through the spokes and hold the spokes rigidly fixed to the clamps and bands. The inner ends of the spokes are provided with adjustable nuts 15 so that the bands may be normally held in true circular form and in proper concentric relation. Resilient washers 15' are preferably interposed between the nuts 15 and the bearings 9 so that the flexing of the bands may be facilitated.

Figure 2:
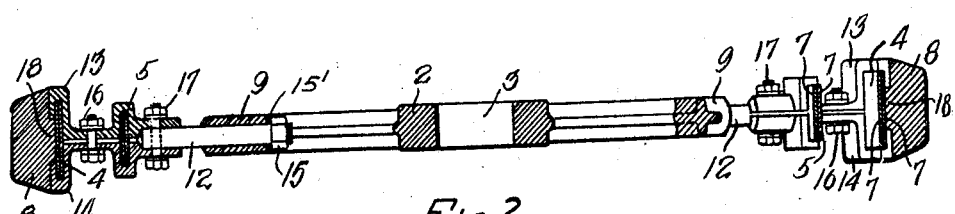
Figure 2 is a sectional view of the wheel taken on the line 2—2 of Figure 1.

It will be noted by referring to Figure 2 that the outer extremities of each pair of clamps when clamped about the bands, are spaced from each other, thereby allowing the annular flange 18 of the tire to be tightly held therebetween.

By constructing the wheel as has been explained in the foregoing a sturdy structure is produced and yet at the same time the various parts of the wheel may be readily assembled or disassembled and the tire readily put on or removed. With the spokes fixed to the bands and slidably engaging the hub member, it is apparent that the portions of the bands in proximity to the portion of the tire which happens to be resting upon the ground will be pressed inwardly in conformity with the tire and thereby greatly increase the shock-absorbing qualities of the structure.

I claim:

1. A vehicle wheel comprising a hub member provided with a plurality of radial bearings, a circular resilient band spaced outwardly from said member and concentrically disposed relative thereto, spokes movable radially in said bearings, and a pair of clamps associated with each spoke and disposed on opposite faces of said wheel adapted to clamp said spokes and band together.

2. A vehicle wheel comprising a hub member provided with a plurality of radial bearings, a plurality of concentrically disposed bands spaced from each other and from said member and comprising laminated resilient strips one within the other, radially movable spokes slidably disposed in said bearings, and a pair of clamps associated with each spoke and disposed on opposite faces of the wheel adapted to clamp said bands and spokes in fixed relation.

In testimony whereof, I have hereunto set my hand at Oakland, California, this 10th day of December, 1920.

JOSIAH A. DEWEY.

In presence of—
L. L. M. SALSBURY.